United States Patent [19]

Quinn

[11] Patent Number: 4,910,633
[45] Date of Patent: Mar. 20, 1990

[54] MAGNETIC LEVITATION APPARATUS AND METHOD

[76] Inventor: Louis P. Quinn, 5815 Lamas St., San Diego, Calif. 92122

[21] Appl. No.: 241,482

[22] Filed: Sep. 7, 1988

[51] Int. Cl.⁴ .............................................. F16C 39/06
[52] U.S. Cl. .................................... 361/144; 361/147; 310/90.5
[58] Field of Search .............. 361/139, 143, 144, 146, 361/147, 159; 310/90.5; 307/104; 73/517 R, 517 B, 518–520; 74/5.46; 104/281, 283, 284; 156/DIG. 62; 324/200, 202, 205, 244, 258, 259

[56] References Cited

U.S. PATENT DOCUMENTS

| | | | |
|---|---|---|---|
| 2,377,175 | 5/1945 | Peer | 307/11 |
| 2,566,221 | 8/1951 | Lovell | 307/11 |
| 3,215,901 | 11/1965 | Carniol | 361/144 |
| 3,512,852 | 5/1970 | North | 310/90.5 |
| 3,664,196 | 5/1972 | Codina | 73/517 B |
| 3,721,984 | 3/1973 | Codina | 324/43 R |
| 3,791,704 | 2/1974 | Perper | 310/90.5 |
| 3,815,963 | 6/1974 | Wilk | 310/90.5 |
| 3,860,300 | 1/1975 | Lyman | 310/90.5 |
| 4,088,379 | 5/1978 | Perper | 310/90.5 |
| 4,454,820 | 6/1984 | Raschbichler | 104/281 |
| 4,483,570 | 11/1984 | Inoue | 310/90.5 |
| 4,521,854 | 6/1985 | Rhim et al. | 364/400 |
| 4,585,282 | 4/1986 | Bosley | 310/90.5 |

Primary Examiner—A. D. Pellinen
Assistant Examiner—David Osborn
Attorney, Agent, or Firm—Brown, Martin, Haller & McClain

[57] ABSTRACT

A method and apparatus for levitating objects in a magnetic field, comprising disposing at least one electromagnet having a centrally disposed core with at least one end positioned adjacent an outer surface of the electromagnet, connecting the electromagnet to a switchable electrical power source, and mounting at least one magnet on the object to be levitated. At least one magnetic field sensor is disposed adjacent the core end for providing an output signal indicative of a magnetic field level and orientation. A reference source is used for generating a variable reference signal which is applied to one input of a comparison element which is in turn connected to the sensor at a second input. The comparison element is used for comparing the respective voltages generated by each source, sensor and reference, and for providing an output signal indicative of a relative status of the two. The output signal is applied to a field strength controller connected to the comparison element and in series with the power source for adjusting electrical power delivered to the electromagnet in response to changes in the comparison output signal.

12 Claims, 2 Drawing Sheets

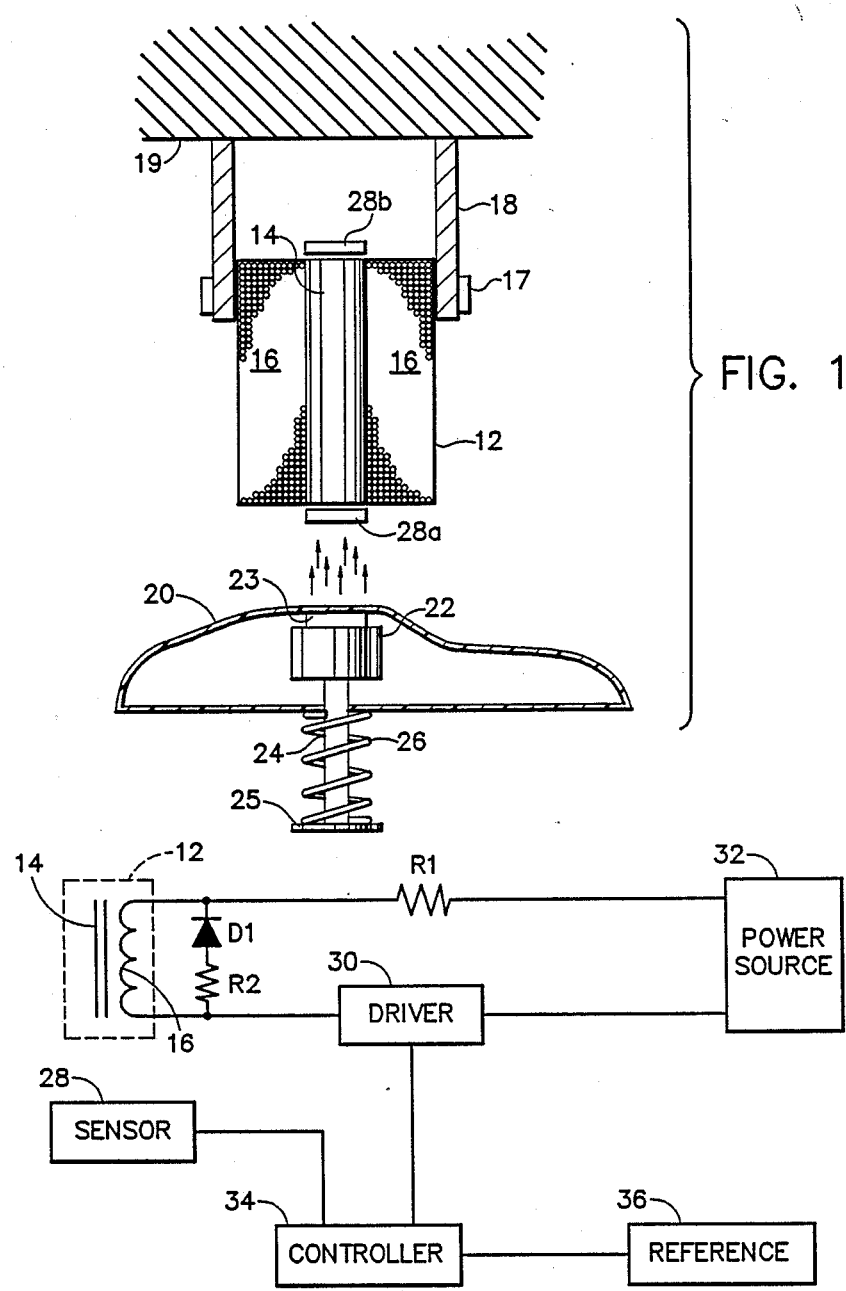

MAGNETIC LEVITATION APPARATUS AND METHOD

BACKGROUND OF THE INVENTION

1. Field of the Invention

The present invention relates to magnetic fields and levitation and more particularly to a method and apparatus for levitating objects using a magnet attached to the object to principally lift an object toward a core element of an electromagnet while driving the electromagnet with a variable duty cycle and frequency power source to fine tune the levitation forces. The invention further relates to a method of detecting magnetic field strength and variations therein between the core of an electromagnet and an adjacently suspended permanent magnet.

2. Background of the Related Art

The ability to levitate objects in a magnetic field is considered to be useful for many applications. One obvious application is in the area of model displays and toys. Levitation is very useful for adding a sense of realism and accuracy as part of suspending many models, such as those of satellites, aircraft, spacecraft, and the like, in mid-air. It is also desirable to be able to suspend some objects that comprise an artistic formation or work in mid-air. At the same time, however, levitation has beneficial applications for scientific work such as where isolation of a chemical or material both electrically and physically from its surroundings is desired. It may also be desirable to use magnetic levitation to suspend some materials during processing or storage to counterbalance some of the forces of gravity or to better control material positioning in low gravity environments.

In the past, several attempts have been made to provide methods or apparatus for levitating objects. Generally, such apparatus comprises one or more electromagnets, although permanent magnets have been used in some configurations, powered by an adjustable strength current source. The electromagnets are suspended above, or below, an object to be levitated and generate magnetic fields which are used to attract metal in the object, or repel permanent magnets mounted on the object. The electrical current supplied to the electromagnets is adjusted to vary the strength of the magnetic field established by the electromagnet so as to just counter the force exerted by gravity on a suspended object.

One major problem in previous levitation apparatus was to sufficiently or properly balance magnetic attraction, or repulsion, against gravitational forces on a levitated object to achieve levitation. That is, the object must be levitated with sufficient force to prevent releasing it to fall and, at the same time, without attracting it so strongly as to cause it to contact the magnet or surrounding structure. This is accomplished using a combination of sensors to detect the magnetic field strength, and feedback control over the electromagnets based on the sensor data. However, previous attempts at such controls have produced complicated, generally expensive, control circuits which operate unsatisfactorily in many applications. The sensors require very precise or critical alignment which precludes many commercial applications. Transient lateral motion or wobble of the object also causes severe problems for the feedback controls typically resulting in loss of levitation.

What is needed is a method and apparatus for levitating objects that has less stringent construction requirements or operational limitations and is low in complexity.

SUMMARY

In view of the above problems and limitations of the art, one purpose of the present invention is to provide a method and apparatus for supporting objects in a magnetic field.

An advantage of the present invention is that it provides for object support in a self-aligning mode that decreases sensitivity to transient lateral motion.

Another purpose of the present invention is to provide support for objects in a magnetic field using a levitation apparatus that is both very efficient and low in complexity.

These and other purposes, objects, and advantages are realized in a method and apparatus of levitating objects in a magnetic field comprising, positioning at least one electromagnet above an object or objects to be levitated and connecting the electromagnet to a switchable electrical power source. The electromagnet employs a series of windings disposed on a centrally positioned core comprising a material having a high magnetic field saturation value and a rapid rise time and decay in the induced field. The core has at least one end positioned adjacent an outer surface of the electromagnet. At least one magnetic field sensor is disposed adjacent this core end and is configured to provide an output signal indicating a relative magnetic field strength. At least one magnet, preferably a permanent magnet, is secured to the object to be levitated having magnetic poles aligned for attraction to said energized core. A field strength controller is connected to the sensor and in series with the power source for adjusting electrical power delivered to the electromagnet in response to variations in object position from a desired position.

The magnetic field sensor preferably provides an output signal proportional to a sensed magnetic field level. The magnetic field controller comprises a reference voltage generator for generating a selected, but adjustable, reference voltage level signal which is monitored by a voltage comparator connected to both the sensor and the reference generator for comparing respective voltages generated by each and for providing an output signal indicative of a relative status of the two. The output from the comparator is used to control or gate power to the electromagnet.

In further aspects of the invention, a switching transistor, generally of the high power FET type, is disposed in series with the power source for the electromagnet. An input gate of the FET is connected to a gating element for applying an activation or gating voltage to the transistor in response to the comparator output signal. An exemplary gating element comprises a timer whose output is triggered by the comparator output.

In the method of the present invention, the electromagnet is used to generate a pulsed magnetic field to adjust and maintain the vertical position of the levitated object. This is accomplished by detecting field strength of the magnet on the levitated object at a surface of the core facing the object and adjusting the pulsed field to maintain a desired field strength.

The field strength of the object magnet relative to the fixed end of core position is determined by mounting a Linear Output Hall Effect transducer on the end of the core with a fixed orientation with respect to generated magnetic fields and detecting voltages produced by said transducer. This transducer is able to deduce the position of the levitated object by the magnetic field of the magnet on the object, with the signal quadrupuling as the distance between the sensor and the magnet on the levitated object is cut in half. The magnetic field of the electromagnet attempting to levitate the object will complicate this relationship. To remove this complication, this design turns on the electromagnet for a timed period, then senses the position of the levitated object when the electromagnet is off. When the comparator connected to the sensor determines the object to be too far away by comparing the signal from the sensor with that of the reference it will output a signal to the timer, which will then turn on the field strength controller allowing current to flow in the electromagnet for a timed interval. These events can occur at a rate of several hundred times per second.

The levitation apparatus can further employ a second magnetic field sensor mounted adjacent the opposite end of the electromagnet core from the position of the first sensor and oriented to provide an output signal of opposite sign when aligned with the same magnetic field lines. The output of the two sensors are coupled together through a summation element to generate a signal from the sensor nearest the levitated object that is free of the effects of the electromagnet and represents only the effects of the magnetic field of the magnet on the levitated object. This allows reliable knowledge on the position of the levitated object even with fluctuating currents passing through the electromagnet. This allows a 100% duty cycle or nearly direct current operation, allowing very precise control of the levitated object.

BRIEF DESCRIPTION OF THE DRAWINGS

The novel features of the present invention may be better understood from the accompanying description when taken in conjunction with the accompanying drawings in which like characters refer to like parts and in which:

FIG. 1 illustrates a cross-sectional view of a levitator constructed according to the principles of the present invention;

FIG. 2 illustrates a control system for use with the apparatus of FIG. 1 in block diagram form;

DESCRIPTION OF A PREFERRED EMBODIMENT

Figure 3:
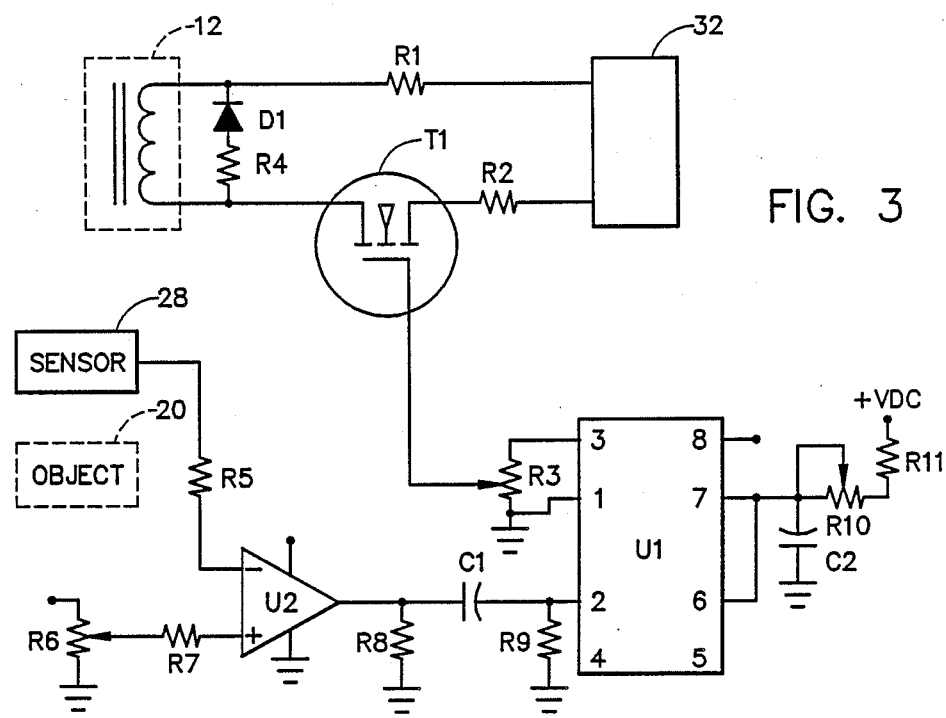
FIG. 3 illustrates exemplary control circuitry for implementing the control system of FIG. 2 in schematic form.

The present invention provides a method and apparatus for levitating or suspending one or more objects in a magnetic field. This is accomplished by securing one or more magnets to one or more portions of the object to be levitated and positioning an electromagnet above the object. The electromagnet has a fast current rise time, and decay time for the induced field in the core, and a magnetic core with a high level of saturation. A magnetic field sensor is mounted on a central portion of the electromagnet core and used in a feedback control loop to monitor magnetic fields between the core and magnets on the levitated object. A control circuit is implemented as part of the feedback loop to adjust and control variations in the magnetic field generated by the electromagnet.

An apparatus constructed according to the principles of the present invention is illustrated in perspective in FIG. 1. In FIG. 1, an electromagnet 12 having a substantially solid ferro-magnetic core 14 and coil 16 is supported from a support frame or structure 18. The electromagnet 12 generally comprises a cylindrical coil 16 wrapped tightly about a cylindrical core 14, although the core can also have elliptical, triangular, rectangular or other geometric shapes for its cross-section and still be useful for the present invention. The core 14 is generally positioned at the center of a central longitudinal axis extending though the electromagnetic coil 16. However, the core 14 need not occupy an exact centerline position within the coil 16.

The electromagnet 12 is constructed according to principles and techniques well known in the art and a variety of such magnets are available that are useful with the method and apparatus of the present invention. In an exemplary embodiment, the electromagnet coil 16 was constructed from number 26 gauge copper wire wrapped in about 570 turns about a ferrite core. However, other material such as nickel alloys can be used to construct the core 14. It is only necessary that the core be highly attractive of other magnets as discussed below.

The electromagnet is held in place using one of a variety of fastening techniques such as, but not limited to bolts 17, C or U-shaped clamps, adhesive, or bonding agents (epoxy or casting resins). Where the magnetic fields employed allow a sufficiently large separation distance between the levitated object (see below) and the electromagnet 12, the electromagnet can be supported on a non-magnetic material such as a sheet 19 of plastic or metal which can extend between the object and the core 14. This has the advantage of better allowing incorporation of the electromagnet into a shell or other form of housing that is part of a display device without leaving the electromagnet 12 visible.

The structure of FIG. 1 is for purposes of illustration and clarity, used only in describing the invention and can have many alternative shapes or designs. As for example, the support structure (17, 18, and 19) can employ a part of a work of art or visual representation which matches or corresponds to the aesthetic appearance of the object to be levitated. Examples would be clouds or planets which present a better visual or aesthetic impact for space or aeronautical displays.

Suspended below the electromagnet 12 is a levitated object 20. In the illustration of FIG. 1 the object 20 is shown as a simple geometric form. However, it will be readily understood by those skilled in the art that the levitated or suspended object, or objects, can obtain several variations in form, shape, and weight to be used with the teachings of the present invention.

The object 20 has one or more magnets 22 mounted within it. In the most basic embodiment, the object 20 is very lightweight and employs a single magnet 22 secured to a portion of the object to be suspended directly beneath the electromagnet 12. The magnet 22 is typically a small, preferably high strength, permanent magnet. Alternatively, in some applications an electromagnet can also be employed for the magnet 22. This allows higher field strengths, especially where superconducting materials may be available for manufacturing the conductor in the electromagnet coil. However, use of an electromagnetic structure for the magnet 22 also detracts from part of the advantage of the invention and adds complexity to the stabilization of the object 20 since power leads must be accounted for.

In the present invention, the electromagnet 12 is not used to generate magnetic fields which levitate the object. That is, the magnetic field from the magnet 22 is responsible for a majority of the force needed to levitate the object 20 as opposed to the field from the electromagnet 12. The levitated object magnet 22 is attracted to the ferrite core 14 of the electromagnet 12. In fact, if the levitated object is raised too high, or too close to the electromagnet core 14 even without current applied to the coil, this attraction would overcome the force of gravity on the object 20 and cause it to strike the electromagnet 12.

Although in the embodiment illustrated the magnet 22 is orientated for attraction to an electromagnet positioned above it, it will be understood that a similar result may be obtained by locating electromagnet 12 below the object with the magnet orientated for repulsion from the electromagnet.

The magnetic field strength required for the magnet 22 is determined by the mass of the object 20 to be supported in the generated magnetic fields. Obviously larger objects require larger magnetic field strengths. The field strength for attracting the magnet 22 to the core 14 at the point of levitation is estimated to occur for a field force equivalent to at least 60-80 percent of the weight of the object. The remainder of the necessary attraction comes from the electromagnet 12 and is typically supplied in short pulses. An exemplary embodiment of the present invention used a magnet having a strength of 900 gauss for supporting an object having a mass on the order of 23 grams. However, much higher field strengths are also envisioned for use with the invention limited only by the saturation of the magnetic field sensors discussed below.

The allocation of forces or relative magnetic field strength away from the electromagnet 12 differs substantially from previous approaches to magnetic levitation. This assignment of the main object support role, or main object levitation force (through attraction), to the magnet 22 instead of the electromagnet fields provides several advantages for the present invention.

The magnet 22 can be secured in place on the object 20 using several fastening means such as bonding agents, bolts, clamps, epoxy, etc. In some embodiments, it has been found beneficial to secure the magnet 22 in place using a resilient or spring like member between the object and the magnet. This is illustrated in FIG. 1 by using a resilient foam or similar material configured in the form of a thin block 23. Alternatively, a spring assembly is used having a rod 24 attached to the magnet 22 and terminating in a ridge, plate or other extension 25 to hold a spring 26 in place on the rod 24. The spring 26 presses against a wall, extension, or stop on the object 20.

A resilient member is used in order to decrease or dampen the effects of oscillations created by some perturbations in the magnetic fields. This resiliency can also allow greater resistance to external dislocation. In addition, when several levitator devices are used in tandem, say to lift a cube by each of its corners, the magnets should use resilient mounting means to prevent oscillations between the separate support systems. However, the method of the present invention does not require the use of a resilient member to achieve levitation.

As seen in FIG. 2, the electromagnet 12 is connected through wires or cables to a current driver 30 and power source 32. The electromagnet 12 generates a magnetic field according to various levels of current or power provided by the power source 32 through the driver 30. The settings are chosen with regards to stable positioning of the object 20.

As stated above, the structure of the present invention functions by attraction of the magnet 22 to the material comprising the core 14 of the electromagnet 12 to provide the main upward force for levitating the object 20. In the alternative the invention can operate by repulsion against a magnet. It is estimated that on the order of 75 to 90 percent of the force required for levitating the object 20 should be provided by the magnet, or magnets, 22 interacting with the core 14. Although, control range is improved and the levitation device less sensitive to an exact reference (see below), i.e., the reference voltage swing allowing levitation, if the core attraction is providing a lesser amount of the energy needed for levitation. The remainder of the necessary force is provided by the electromagnet 12.

The driver 30 switches or pulses the electromagnet 12 to achieve a fine tuning of the magnetic fields extending between the electromagnet core 14 and the magnet 22 to provide a stable, and self aligning, operation for the levitation apparatus 10. The driver 30 is actuated by a controller 34 which uses a information or an output signal provided by the magnetic field sensor 28 to determine the relative field strength to be provided by the electromagnet 12.

At least one magnetic field sensor 28 is mounted on the electromagnet 12 adjacent to the core 14 where an end of the core 14 faces the object 20. This sensor is used to detect the relative strength of the magnetic field extending between the magnet 22 and the electromagnet 12 through the core region.

In the preferred embodiment, the sensor 28 comprises a hall effect device mounted on the electromagnet adjacent to the core, on the end facing the levitated object. In alternate embodiments, additional hall effect devices 28 are mounted on an opposite end of the core 14 and allow monitoring of relative field strengths of the electromagnet.

Using hall effect type sensors, the controller 34 is configured to compare the voltage output of the magnetic field sensor 28 with a reference voltage provided by the a reference source 36 to determines when the position of the magnet 22 is changing relative to the fixed location of the coil 12. This in turn determines when the driver 30 needs to apply current to the coil 14 to compensate or maintain preselected object positions.

During operation, the current driver or switcher 30 interrupts and controls the flow of current to the electromagnet 12 from the power source 32. The current driver 30 is connected between the power source 32 and the electromagnet 12 and has a control input which is connected to a comparison/timer element in the controller 34. The comparison element (not shown in FIG. 2) is connected at a first input to the magnetic field sensor 28 to receive an output voltage or signal from the sensor. A second input of the comparison element is connected to the reference voltage source 36. The reference voltage source 36 has an output which is adjusted to match the output voltage of the sensor 26 when the object 20 is suspended in a desired position or at a desired levitation height. It will be readily understood by those skilled in the art that the output of the reference voltage source 36 should be adjustable and is adjusted according to the weight or mass of the object 20 and the type and number of magnets 22 employed. However, once adjusted for a particular levitation position, the voltage source should not require further adjustment during use unless the structure or weight of the object are changed.

Operation of the present invention is better understood by reference to FIG. 3 where circuitry used to implement the driver 30, controller 34, and reference source 36 are illustrated in further detail in schematic form. In FIG. 3, the coil 16 is shown connected on one end to a power source 32 through a current control or limiting resistor R1. A typical value for resister R1 is 5 ohms. The power source 32 provides the necessary voltage and current for operating the coil 16 and represents one of a variety of power supplies known in the art. The other end of the coil 16 is connected to a power FET type transistor T1 which switches on and off to gate current through the coil 16 to ground. In a preferred embodiment, the FET T1 is used as a switchable ground, however, it can also be connected to a lower or higher voltage level terminal of the power source 32 as desired, taking into account the proper polarity of the transistor. The FET T1 is shown connected through an isolation and current limiting resistor R2 to a ground terminal of the power source 32. The resister R2 is typically on the order of 0.25 ohms in value.

The FET transistor can comprise one of several known relatively high power or high current FET transistors commercially available. An exemplary transistor for T1 is an N-channel power FET supplied by the Siemens company and designated by part number BUZ20. However, those skilled in the art will understand how to select other FET and non-FET type transistors to accommodate the switching function of T1 where applicable.

The control or input gate of the transistor T1 is connected to an output terminal for the timing circuit U1, discussed below. The output terminal is connected to the transistor T1 through a variable resister R3 to control the voltage range applied to the gate of the transistor T1.

A diode, D1, in series with a resister R4, is connected in parallel with the coil 16 to provide a discharge path for the coil 16 to prevent damage to circuitry when transistor T1 cuts off.

The magnetic field sensor 28 preferably comprises a Linear Output Hall Effect Transducer produced by the Micro Switch company division of Honeywell corporation and generally referred to by the trademark LOHET. This type of sensor is chosen for its highly linear, stable, and field orientation sensitive output. In addition, this type of sensor is packaged in a configuration that makes installation very simple and compact. However, other types of field sensors can be integrated into the circuitry of the present invention.

The main control circuit of FIG. 3, which corresponds to the controller 34 of FIG. 2, comprises a voltage comparator U2 connected to receive input voltages from the transducer 28 and a variable level voltage reference on an input side and to a timer, U1, on an output side. The comparator U2 is connected to the transducer 28 through a resister R5 and to a variable resister R6 through a resister R7 which is used to establish a desired reference voltage. An exemplary circuit element found useful for the voltage comparator, U2 is an OP-AMP circuit manufactured by the Texas Instruments company under the part designation TOP271CP. However, those skilled in the art will readily recognize that other circuit elements are useful to implement the comparator U2.

The output of the comparator U2 is connected to a trigger input of a timing device U1. Typically a resister and capacitor network is used to shape the output from the comparator U2 to provide an appropriate trigger signal for the timer U1. These components are shown as resisters R8 and R9 and capacitor C1. This provides a low going trigger pulse of controlled voltage level instead of a steady state output level as would normally be present on the output terminal of the comparator U2.

The timing device which can comprise a 555 timer, has appropriate timing control components such as resistor R10 and capacitor C2 connected to terminals for setting basic timing. A variable resister R10 is found very useful in setting the pulse duration output to the transistor T1. This control is especially valuable if there is no resilient supports or connections used for the magnet 22. This control fine tunes the position setting pot and acts somewhat like a gain control in a feedback circuit. In addition, a resister R11 may be used to set the shortest minimum pulse length for the pulse applied to the gate of the transistor T1.

The output of the timer U1 is used as a pulse source for the FET T1 which is applied to a gate to turn on the FET T1. The start of the gate pulse is determined by the comparator inputs changing relative potentials, i.e., B greater than A, to A greater than B. The output of the comparator in this design will cause the timer to start a gate pulse when it changes from a high state to a low state. The gate pulse duration will be controlled by the timer's external circuitry. This gate control circuitry can be made in many ways by those skilled in the art.

As discussed above, the transducer 28 is mounted on or adjacent to the end of the core 14 that faces the object 20. The active portion of the transducer 28 is positioned substantially in the center of the core and detects the field of the magnet 22 as it interacts with the core.

The transducer's output is connected to the inverting input of the comparator, a reference voltage is selected off the voltage divider provided by R7 and applied to the noninverting input. The transducer's output with no magnetic field present is approximately one half the supplied voltage. Depending on the direction of the magnetic field, the output will be driven either higher or lower than this midpoint.

In this design, as the magnet gets closer to the electromagnet core 14 the output of the transducer 28 decreases toward zero volts. When the output of the transducer 28 is lower than the reference voltage, the comparator outputs a high level voltage which indicates that the object is too close to the electromagnet. If the output of the transducer 28 is higher than the reference voltage, the output of the comparator is low or zero which indicates the object is drifting too far away from the electromagnet core 14.

The pulse shaping network transfers a low going pulse to the trigger of the timer when the output of the voltage comparator goes low, a high going signal has no effect on the trigger circuitry. If the timer U1 receives a low going pulse on the trigger input it begins a timing cycle. While in a timing cycle or mode, the timer U1 provides or generates a high level output signal which is applied to the gate of the power transistor T1. The transistor T1 is turned on by the presence of this signal and remains on as long as the output from the timer U1 is high. Therefore, the pulse width of the FET transistor T1 output is determined by the timing or duty cycle of the timer circuit, with the start of the pulse being determined by the comparator.

While the FET transistor T1 is turned on, the output from the transducer 28 decreases. This results from current applied to the electromagnet which generates a magnetic field oriented in the same direction (pole to pole) as the permanent magnet on the object. This causes the output of the comparator to go positive which prevents constant triggering of the timer U1 as current flows to the electromagnet.

The transducer 28 is also normally blind to the presence of the magnet 22 during the time the electromagnet is on and will not be able to sense the object's presence until the magnetic fields in the ferrite core for the electromagnet die down or decay to a sufficiently low value. As soon as the output level from the transducer 28 increases above the reference voltage input to the comparator, in other words the object magnet 22 is too far away, the comparator output goes low turning on the timer U1 and the electromagnet 12 and pulling the magnet closer.

To facilitate operation and account for the magnetic field generated by the electromagnet during operation two alternative methods of operation can be used.

Figure 4:
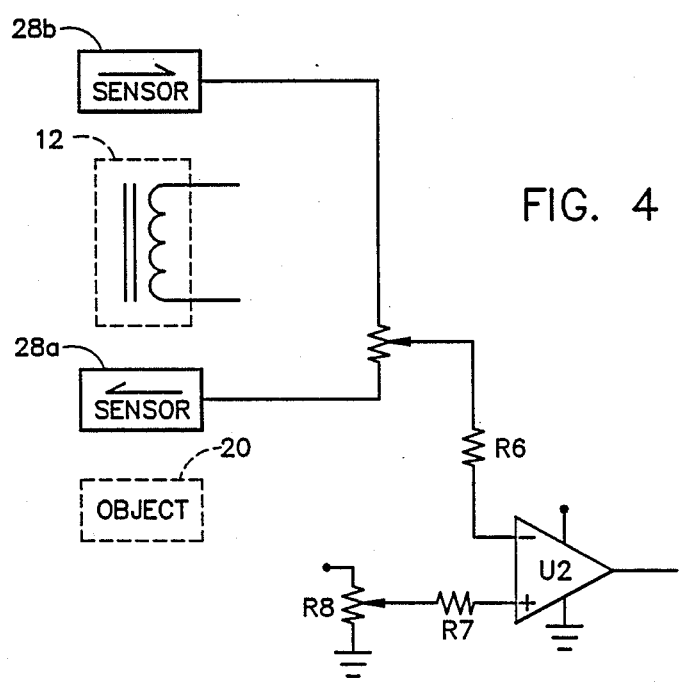
FIG. 4 illustrates the connection of two magnetic sensors to the apparatus of FIG. 3.

In a first technique, a second transducer 28b is mounted on the core of the electromagnet 12 on the opposite end from that of the transducer 28a. If the transducer 28b is oriented in an opposite sense from the transducer 28a, then magnetic fields will generate an opposite polarity signal on the transducer 28b output as opposed to the transducer 28a output. As shown in FIG. 4, this arrangement is used to advantage by summing the output of the two transducers to generate a signal that represents the difference in measured magnetic field between the two sensors. Since both sensors are mounted on the core of the electromagnet 12, which has a substantially symmetrical magnetic field, they both measure this field. In addition, the transducer 28a detects the field produced by the object magnet 22 while the transducer 28b is effectively shielded from that field by the core 14. This means that any difference in measured field between the sensors is the field of the magnet 22 as measured from the end of the core 14. This field level is then used to accurately determine the relative position of the magnet 22 or object 20 from the electromagnet 12.

In a second approach, a current measuring element is applied to the leads of the coil 16 and used to detect the current supplied to the coil. This current then provides, through known electromagnetic relationships, the field being generated by the coil 16. This field level is used to approximate the voltage level that would be affected in the transducers 28 by such a field.

One advantage of the present invention is that the apparatus is self centering because of the attraction of the magnet 22 to the electromagnet core 14. The attractive forces draw the object into alignment with the core. In addition, the control circuit of the present invention quickly adjusts to any changes or attempted changes in object position and exhibits a large amount of self damping.

What has been described, then is a new method and apparatus for suspending or levitating objects in magnetic fields which provides very stable, self aligning object support with low complexity.

The foregoing description of preferred embodiments has been presented for purposes of illustration and description. It is not intended to be exhaustive nor to limit the invention to the precise form disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What I claim is:

1. An apparatus for levitating objects in a magnetic field, comprising:
   at least one electromagnet positioned in alignment with an object, said electromagnet having a core centrally disposed within, said core having one end positioned adjacent an outer surface of said electromagnet;
   at least one electrical power coupling for connecting said electromagnet to an electrical power source;
   a first magnetic field sensor disposed adjacent said one core end, and a second magnetic field sensor mounted adjacent an opposite core end and in an opposite orientation to said first sensor with respect to magnetic fields generated by said electromagnet, said sensors capable of providing output signals proportional to a sensed magnetic field level;
   at least one magnet secured to the object to be levitated in alignment with said core and having a field strength sufficient to move said object relative to said core;
   summing means for summing said sensor output signals;
   reference means for generating a reference voltage signal;
   comparator mean connected to said summing means and reference means for comparing respective voltages generated by said summing and reference means;
   a field strength controller connected in series with said power source for adjusting electrical power delivered to said electromagnet in response to differences detected by said comparator means.

2. The levitation apparatus of claim 1 wherein said core has a high field saturation value and a low retention value.

3. The levitation apparatus of claim 1 wherein:
   said electrical power coupling comprises two conductive lines, one of said lines being connected to said electromagnet and the other being connected to said field strength controller; and
   said field strength controller comprises a switching transistor disposed in series with said electromagnet.

4. The levitation apparatus of claim 3 wherein said transistor is a power Field Effect Transistor.

5. The levitation apparatus of claim 3 further comprising gating means coupled between said comparison means and said power transistor for applying a turn on voltage to a control input of said transistor in response to said comparison means output signal.

6. The levitation apparatus of claim 5 wherein said gating means comprises a timer whose output is triggered by said comparison means output signal; and said comparison means comprises a comparator having two inputs, a first one connected to said summing means and a second connected to said reference voltage source.

7. The levitation apparatus of claim 1 wherein said magnetic field sensors each comprise a Linear Output Hall Effect sensor disposed adjacent said core in fixed alignment with magnetic fields generated thereby.

8. The levitation apparatus of claim 1 wherein said at least one magnet secured to the object is a permanent magnetic having north and south poles aligned for attraction to said core.

9. A method of levitating objects in a magnetic field, comprising the steps of:
- disposing an electromagnet adjacent to an object to be levitated, said electromagnet having a high field low retention core;
- mounting a magnet on said object, said magnet orientated to be attracted to said core of said electromagnet and having a field strength sufficient to lift said object toward said electromagnet;
- generating a pulse magnetic field using the electromagnet;
- mounting a first Linear Output Hall Effect transducer on a first end of said core with a fixed orientation with respect to magnetic fields generated by said electromagnetic;
- mounting a second transducer on an opposite end of said core from said first transducer and in an opposite orientation with respect to magnetic fields generated by said electromagnet;
- detecting voltages produced by said transducers;
- summing outputs of said transducers;
- generating a reference level voltage;
- comparing said reference level voltage to said summed transducer output; and
- adjusting said pulsed field in response to a detected difference.

10. The method of claim 9 wherein said step of disposing an electromagnet adjacent an object comprises supporting said electromagnet above said object.

11. The method of claim 9 wherein said step of generating further comprises driving the electromagnet with a variable duty cycle power source.

12. A method of levitating objects in a magnetic field, comprising the steps of:
- disposing an electromagnet adjacent an object to be levitated, said electromagnet having a core centrally disposed within it;
- securing a magnet to said object with its magnetic poles orientated for movement relative to said core, said magnet having a field strength sufficient for moving said object relative to said core;
- positioning a pair of magnetic field sensors one on each end of said core and in opposite orientations with respect to magnetic fields generated by said electromagnet;
- generating a pulsed magnetic field using the electromagnet;
- detecting output voltages produced by said magnetic field sensors;
- summing said second output voltages;
- generating a reference level voltage;
- comparing said summed sensor output voltages with said reference level voltage; and
- adjusting said pulsed magnetic field in response to differences between said compared voltages.

* * * * *